Patented July 12, 1938

2,123,520

UNITED STATES PATENT OFFICE 2,123,520

PROCESS OF MAKING ALDEHYDES

Dale Friend Babcock, Elmhurst, and James Herbert Werntz, Marshallton, Del., assignors to E. I. du Pont de Nemours & Company, Wilmington, Del., a corporation of Delaware No Drawing. Application October 20, 1934, Serial No. 749,174

23 Claims. (Cl. 260—138)

This invention relates to the oxidation of long-chain primary alcohols to corresponding aldehydes and more particularly it pertains to the oxidation of primary straight-chain alcohols having 8, 10, 12, and 14 carbon atoms with a silver catalyst.

This invention has as an object the preparation of aldehydes from long-chain primary alcohols. Other objects will appear hereinafter. These objects are accomplished by vaporizing the alcohol, mixing the vapor with oxygen or air, and passing the gaseous mixture over a silver containing catalyst at a temperature sufficient to cause the oxidation of the alcohol to the corresponding aldehyde.

The following examples are given in order to more completely describe the invention:

Example I

A mixture of primary alcohols containing 8, 10, 12, and 14 carbon atoms, obtained by the carboxylic hydrogenation of coconut oil and known in commerce as crude dodecyl alcohol, was pumped into a preheater consisting of a steel tube 1.5 inches inside diameter and 3 feet long, and packed with glass rings at the rate of 0.20 gram mol. per minute. Air was introduced into the preheater at the rate of 0.45 gram mol. per minute or at an oxygen rate of 0.09 gram mol. per minute. The resulting air-alcohol mixture was preheated to 290° C. These preheated gases were then passed through a catalyst chamber consisting of a copper tube 1.5 inches inside diameter by 10 inches long and containing 100 silver gauze disks made from 20 by 20 mesh gauze. The catalyst chamber was maintained at a temperature of 530° to 575° C. during the reaction. An analysis of the converted liquid product indicated that 20% of the crude dodecyl alcohol had been converted to a mixture of aldehydes without the formation of significant quantities of esters, acids or other polymerized materials. The effluent gas contained 3 to 4% carbon dioxide and less than 0.5% oxygen.

Example II

Pure dodecyl alcohol was pumped into the preheater described in Example I at the rate of 0.16 gram mol. per minute. Air was introduced into the preheater at the rate of 0.40 gram mol. per minute or at an oxygen rate of 0.08 gram mol. per minute. The resulting air-alcohol mixture was preheated to 290° C. These preheated gases were then passed through the catalyst chamber described in Example I, while that chamber was maintained at a temperature of 530° C. An analysis of the converted liquid product indicated that 23% of dodecyl alcohol had been converted to dodecyl aldehyde without the formation of significant quantities of acid or ester.

Example III

Octyl alcohol was pumped into the preheater as described in Example I, at the rate of 0.40 gram mol. per minute. Air was introduced into the preheater at the rate of 1.02 gram mols per minute or at an oxygen rate of 0.20 gram mol. per minute. The resulting air-alcohol mixture was preheated to 250° C. The preheated gases were then passed through the catalytic chamber described in Example I, while the temperature of said chamber was maintained at 560° C. The converted liquid products were found to contain octyl aldehyde corresponding to a conversion of 60%. Losses to carbon dioxide and other undesirable decomposition products were less than 5%.

Besides the alcohols shown in the examples, other long-chain primary alcohols may be used, whether the carbon chains be normal or branched. The invention is particularly adapted to the treatment of those primary alcohols having eight or more carbon atoms. A particularly desirable mixture of aldehydes is obtained by applying the process of the invention to the mixture of alcohols prepared by the carboxylic hydrogenation of an essentially saturated natural oil such as coconut oil. In place of the air, oxygen or an oxygen and an inert gas mixture may be used. In the preferred conditions for the operation of the process the molecular ratio of oxygen to alcohol is between 0.25 and 0.66.

The temperature in the catalytic chamber during the reaction should be maintained above 400° C. and preferably within the range of 500° to 600° C. The alcohol may or may not contain water, or water vapor may or may not be added to the vapors to be preheated. This modification serves chiefly to provide a better means for controlling the converter temperature.

The mixture of air and alcohol vapor is preheated to a temperature above the boiling point of the alcohol but substantially below the temperature of the reaction chamber. Preferably the preheated temperature is such that a heat balance is maintained under the conditions of operation. For an operation such as in the examples above, this temperature is about 250° to 300° C., but the most favorable preheating temperature will depend on the heat balance and on the scale of operation.

The catalyst used in the applicant's process should be silver or a silver containing alloy and may be in any form or shape, provided sufficient surface is exposed to the gas. The preferred catalyst is silver gauze made up in the manner as described in Example I.

It has been known for many years that methanol could be converted to formaldehyde and more recently ethanol has been converted to acetaldehyde by a similar catalytic oxidation process. It was not at all apparent that high molecular weight alcohols could be subjected to the drastic treatment of heating them to 500° to 600° C. in the presence of oxygen and obtain a satisfactory yield of the desired aldehyde.

An alternate method of converting a primary alcohol to the aldehyde is by catalytic dehydrogenation. This process is not only inferior to the present proposed process in that the catalyst cost is high and a large amount of heat must be added to the system which necessitates a more complicated apparatus, but also the dehydrogenation process produces relatively large quantities of ester as a by-product. As stated, the quantity of ester formed by this oxidation process is small.

The above description and specific examples are illustrative only and are not to be considered as limiting the scope of the invention. Any variation therefrom which conforms to the spirit of the invention is intended to be included within the scope of the claims.

We claim:

1. The process of preparing the corresponding aldehydes from long-chain primary alcohols which comprises passing a mixture containing a long-chain primary alcohol and oxygen over a silver containing catalyst at a temperature in excess of 400° C.

2. The process of preparing aldehydes of at least eight carbon atoms from the corresponding alcohols which comprises passing a mixture containing a primary alcohol of at least eight carbon atoms and oxygen over a silver containing catalyst at a temperature in excess of 400° C.

3. The process of making aldehydes which comprises passing a mixture containing a long-chain primary alcohol and oxygen over a silver containing catalyst at a temperature of 500° to 600° C.

4. The process according to claim 3, characterized in that the molecular ratio of oxygen to alcohol is between 0.25 and 0.66.

5. The process according to claim 3, characterized in that the long-chain primary alcohol contains at least eight carbon atoms.

6. The process according to claim 3, characterized in that the catalyst consists of a multiple number of pieces of silver gauze.

7. The process of making aldehydes which comprises passing a gaseous mixture containing a long-chain primary alcohol and air over a silver containing catalyst at a temperature of 500° to 600° C.

8. The process of making aldehydes which comprises preheating a mixture containing a long-chain primary alcohol and oxygen and passing said preheated gaseous mixture over a silver containing catalyst at a temperature of 500° to 600° C.

9. The process of making aldehydes which comprises preheating a mixture containing a long-chain primary alcohol and oxygen to a temperature above the boiling point of the alcohol but substantially below the temperature of the reaction chamber and passing said preheated gaseous mixture over a silver containing catalyst at a temperature of 500° to 600° C.

10. The process of making aldehydes which comprises preheating a mixture containing a long-chain primary alcohol and oxygen to a temperature of about 125° to 350° C. and passing said preheated gaseous mixture over a silver containing catalyst at a temperature of 500° to 600° C.

11. The process of making a mixture of aldehydes which comprises passing a mixture of long-chain primary alcohols and oxygen over a silver containing catalyst at a temperature of 500° to 600° C.

12. The process of making a mixture of aldehydes which comprises passing a mixture of long-chain primary alcohols, having even-numbered carbon atoms from 8 to 14, inclusive, and air, over a silver containing catalyst at a temperature of 500° to 600° C.

13. The process of making a mixture of aldehydes which comprises preheating a mixture of long-chain primary alcohols, having even-numbered carbon atoms from 8 to 14, inclusive, and air in a molecular ratio of oxygen to alcohol of about 0.5 to a temperature of about 290° C., and passing said preheated gases over a catalyst consisting of a multiple number of pieces of silver gauze at a temperature of 530° to 540° C.

14. The process of making lauryl aldehyde which comprises passing a gaseous mixture of lauryl alcohol and oxygen over a silver containing catalyst at a temperature of 500° to 600° C.

15. The process of making lauryl aldehyde which comprises preheating a gaseous mixture of lauryl alcohol and oxygen and passing the preheated gases over a silver containing catalyst at a temperature of 500° to 600° C.

16. The process according to claim 14, characterized in that the molecular ratio of oxygen to alcohol is between 0.25 and 0.66.

17. The process of making lauryl aldehyde which comprises preheating a mixture of lauryl alcohol and air of a molecular ratio of oxygen to alcohol of about 0.5 to a temperature of about 290° C., and passing said preheated gases over a catalyst consisting of a multiple number of pieces of silver gauze at a temperature of about 530° C.

18. The process of making octyl aldehyde which comprises passing a gaseous mixture of octyl alcohol and oxygen over a silver containing catalyst at a temperature of 500° to 600° C.

19. The process of making octyl aldehyde which comprises preheating a gaseous mixture of octyl alcohol and oxygen and passing the preheated gases over a silver containing catalyst at a temperature of 500° to 600° C.

20. The process according to claim 18, characterized in that the molecular ratio of oxygen to alcohol is betwen 0.25 and 0.66.

21. The process of making octyl aldehyde which comprises preheating a gaseous mixture of octyl alcohol and air of a molecular ratio of oxygen to alcohol of about 0.5 to a temperature of about 250° C., and passing said preheated gases over a catalyst consisting of a multiple number of pieces of silver gauze at a temperature of about 560° C.

22. The process of making aldehydes which comprises passing a mixture containing a long chain primary alcohol and oxygen over a silver containing catalyst at a temperature of 500° to 600° C. and at substantially atmospheric pressure.

23. The process of making aldehydes which comprises passing a mixture containing a long chain primary alcohol of at least eight carbon atoms and oxygen over a silver containing catalyst at a temperature of 500° to 600° C. and at substantially atmospheric pressure, the molecular ratio of oxygen to alcohol being between 0.25 and 0.66.

DALE FRIEND BABCOCK.
JAMES HERBERT WERNTZ.